United States Patent
Shimogori

(10) Patent No.: US 8,751,419 B2
(45) Date of Patent: Jun. 10, 2014

(54) SHIPPING SYSTEM AND METHOD WITH TAXONOMIC TARIFF HARMONIZATION

(75) Inventor: Kotaro Shimogori, Pacific Palisades, CA (US)

(73) Assignee: Shipjo, LLC, Milwaukee, WI (US)

( * ) Notice: Subject to any disclaimer, the term of this patent is extended or adjusted under 35 U.S.C. 154(b) by 293 days.

(21) Appl. No.: 13/277,141

(22) Filed: Oct. 19, 2011

(65) Prior Publication Data

US 2012/0130927 A1    May 24, 2012

Related U.S. Application Data

(60) Provisional application No. 61/458,204, filed on Nov. 19, 2010.

(51) Int. Cl.
*G06F 15/18* (2006.01)

(52) U.S. Cl.
USPC .............................................. 706/12

(58) Field of Classification Search
None
See application file for complete search history.

(56) References Cited

U.S. PATENT DOCUMENTS

| | | | |
|---|---|---|---|
| 8,495,068 B1 * | 7/2013 | Awalt et al. ................. | 707/740 |
| 2002/0091574 A1 * | 7/2002 | Lefebvre et al. ............. | 705/19 |
| 2003/0163447 A1 * | 8/2003 | Sandman ...................... | 707/1 |
| 2004/0064351 A1 | 4/2004 | Mikurak | |
| 2005/0004894 A1 * | 1/2005 | Uy et al. ...................... | 707/3 |
| 2005/0033592 A1 * | 2/2005 | Uy et al. ...................... | 705/1 |
| 2005/0119926 A1 * | 6/2005 | Turetsky et al. ............. | 705/8 |
| 2005/0177426 A1 * | 8/2005 | Holmes et al. ............... | 705/14 |
| 2005/0289168 A1 | 12/2005 | Green et al. | |
| 2006/0036504 A1 * | 2/2006 | Allocca et al. ............... | 705/26 |
| 2006/0136309 A1 | 6/2006 | Horn et al. | |
| 2008/0097933 A1 * | 4/2008 | Awaida et al. ............... | 705/400 |
| 2008/0154926 A1 | 6/2008 | Newman | |
| 2008/0162305 A1 * | 7/2008 | Rousso et al. ............... | 705/27 |
| 2009/0089125 A1 * | 4/2009 | Sultan ............................ | 705/7 |
| 2009/0094542 A1 * | 4/2009 | McKelvey et al. .......... | 715/765 |
| 2009/0138379 A1 * | 5/2009 | Scheman ...................... | 705/27 |
| 2009/0144070 A1 | 6/2009 | Psota et al. | |
| 2010/0023422 A1 * | 1/2010 | Thompson et al. .......... | 705/26 |
| 2010/0023445 A1 * | 1/2010 | Feaver et al. ................ | 705/37 |

* cited by examiner

*Primary Examiner* — Jeffrey A Gaffin
*Assistant Examiner* — Dave Misir
(74) *Attorney, Agent, or Firm* — Jansson Munger McKinley & Shape Ltd.

(57) ABSTRACT

A system, method and computer-readable medium for providing a harmonized classification code for a good based on input including a database adapted to store content including a harmonized tariff classification code module for storing a data structure representing a harmonized classification code tree, the harmonized classification code tree having one or more harmonized classification codes in which the good can be classified, a keywords module for associating and storing keyword data related to the good with one of the harmonized classification codes; and a learning module for learning keywords from the input and associating the learned key words with the one harmonized classification code for the good.

18 Claims, 8 Drawing Sheets shipo Administration Panel

Keyword Suggestion

Search List — 178
Ignored List
Auto Keyword Settings
Autoadded Keywords

Settings | U.S. Management | First Keyword Suggestion
— 174                                — 160

Keywords: — 172    Code: — 170    Count: — 176    +Search  Clear — 182
                                                   — 180

Total Items: 9 - Displaying page 1 of 1      — 166

| Keyword | Code — 168 | Count | Actions |
|---|---|---|---|
| peanut butter | 1704.90.3520 | 4 | Add / Ignore — 162 |
| Mayonnaise | 2103.90.9020 | 4 | Add / Ignore — 162 |
| Belkin Router | 8465.92.0006 | 4 | Add / Ignore — 162 |
| pen | 1301.90.4000 | 3 | Add / Ignore — 164 |
| pen | 2825.30.0010 | 1 | Add / Ignore |
| watch | 9113.20.6000 | 1 | Add / Ignore — 164 |
| helicopter | 8802.11.0030 | 1 | Add / Ignore |
| peanut butter | 1806.31.0041 | 1 | Add / Ignore |
| nintendo | 9504.10.0000 | 1 | Add / Ignore |

Figure 6 shijo Administration Panel

Keyword Suggestion

Search List  — 184
Ignored List
Auto Keyword Settings
Autoadded Keywords

Settings | IRS Management | IRS Keyword Suggestion — 160, 188

Manually Add to Ignored List: [____] Add — 186

Total items 166 14 - Displaying page 1 of 2

| S. No. — 150 | Keyword — 170 | Code — 168 | Count | Actions |
|---|---|---|---|---|
| 1 | neither | 1604.13.1000 | 1 | Delete |
| 2 | and | manual | 0 | Delete |
| 3 | or | manual | 0 | Delete |
| 4 | other | manual | 0 | Delete |
| 5 | similar | manual | 0 | Delete |
| 6 | the | manual | 0 | Delete |
| 7 | of | manual | 0 | Delete |
| 8 | sale | manual | 0 | Delete |
| 9 | for | manual | 0 | Delete |
| 10 | over | manual | 0 | Delete |

Figure 7

SHIPPING SYSTEM AND METHOD WITH TAXONOMIC TARIFF HARMONIZATION

REFERENCE TO EARLIER FILED APPLICATION

The present application claims the benefit of U.S. Provisional Application No. 61/458,204 filed on Nov. 19, 2010 which is incorporated by reference herein.

FIELD

This disclosure relates to the field of electronic commerce, and more particularly to the field of generating accurate information for shipping goods domestically and internationally upon completion of an electronic commerce transaction, and to a system and method for taxonomically learning and generating such information.

BACKGROUND

Electronic commerce including auctions, direct sales and offers for sale have become a fixture in online activity. Ecommerce combined with the increasing popularity of mobile computing, mobile blogging, micro blogging, tweeting, mobile web activity and similar mobile communication, offers buyers and sellers the possibility of finding and providing specialized goods and services, antiques, used items, and other items. Social platforms including social networking and social media sites such as Facebook, LinkedIn, Twitter, You Tube and other socially interactive sites have also become popular for conducting ecommerce and online ecommerce activity. The merging of ecommerce and social platforms allow users to take advantage of how they use the web and internet which is both connecting with each other through their social graph and accessing the web and internet whenever, wherever and however they want. Such an integrated environment provides both buyers and sellers with the need to achieve accurate and timely shipping information for quick and accurate shipment of goods domestically and internationally through such ecommerce transactions and social experiences.

Ecommerce transactions including auctions, direct sales and offers, provide sellers the benefit of price competition among buyers, creating markets for goods and services which are worldwide and which are becoming increasingly mobile. Various types of goods are offered for sale and purchased across thousands of different categories. Such variety requires a universal, updateable, modifiable and intuitive database. The increasing number of categories and sub-categories that are being created to accommodate online ecommerce transactions cause the standard harmonized tariff schedule (HTS) and harmonized tariff code (HTC) classification code databases to be out of date and inaccurate in many respects and instances. There is a need for a taxonomically updateable and intuitive database which can learn and update the HTS and HTC classification data in real time. Such a system and method would benefit from providing modules for adding specific words, phrases, codes or images to imported HTS and HTC classification databases. It would be beneficial to provide the option to selectively update individual and chosen categories based on user input.

In addition, collectors, hobbyists and other purchasers participate in social networking activity, are drawn to ecommerce environments, and are interested in consummating transactions seamlessly without leaving the purchasing platform. Hence a seamless ecommerce environment with mobile access and the ability to complete the ecommerce transaction timely, without interruption and with certainty and security to both the buyer and seller is important and central to the ecommerce, social networking, social ecommerce and social selling platforms. In addition, it is desirable to have a shipping module that can be integrated into any ecommerce platform for providing the benefits described herein.

Ecommerce sites including online auctions have typically experienced the inability to accurately provide shipping costs typically leading to unexpected shipping costs, particularly for international shipments. The inability to accurately quote shipping rates and associated costs taking into consideration specific product attributes are persistent problem for sellers and buyers alike. Thus, a need exists for the parties to such ecommerce transactions to have access to better information in advance about the classification of goods, their associated duties and real shipping costs for their items including both domestic and international shipping options. It is desirable to improve the accuracy of the shipping classification and hence the shipping quote, and provide competitive shipping costs through use of a system that can update shipping information including classification codes, key word descriptors and item classification information taxonomically and on a real time basis.

It is desirable to provide an online shipping system and method having taxonomic international tariff harmonization capabilities which provides for the ability to learn details of products including key words, attributes and the like as that information is keyed in by the buyer or seller. It is also desirable to provide an online shipping system that is easy for buyers and sellers to use, and allows a buyer to easily locate an item for immediate purchase, available to make an offer or place a bid and easily complete a purchase, obtain accurate shipping classification and costs then complete shipping in a secure, safe, seamless and customer friendly environment.

SUMMARY OF THE DISCLOSURE

Preferred embodiments of systems are provided herein which may have a harmonized classification code for a good based on an input including a database adapted to store content with a harmonized tariff classification code module for storing a data structure representing a harmonized classification code tree, the harmonized classification code tree having one or more harmonized classification codes in which the good can be classified. The exemplary systems may also have a keywords module for associating and storing keyword data related to the good with one of the harmonized classification codes and a learning module for learning keywords from the input and associating the learned key words with the one harmonized classification code for the good.

An exemplary system may include a processor configured to receive a query over an application programming interface requesting the harmonized classification code for the good based on the input, the processor accessing the database to retrieve a corresponding group of harmonized classification codes associated with the good. Such exemplary systems may also include an application programming interface displaying the group of harmonized classification codes retrieved by the processor, selecting one harmonized classification code from the group of harmonized classification codes, the one selected harmonized classification code having a keyword group and a keyword group count, and selecting the input and the processor determining a count of keywords from the input.

Another exemplary system may include a processor which increments the keyword group count, and an application programming interface which compares the incremented keyword group count from the input to a predetermined keyword count. An exemplary system may include a processor which updates the determined keyword count and appending the selected input to the keyword group if the determined keyword count from the input is greater than or equal to the predetermined keyword count. An exemplary system may also include a learning module having a module of words the learning module will ignore when learning keywords from the input.

Also contemplated herein are exemplary methods and computer-readable medium which may provide a harmonized classification code for a good based on input including storing content with a harmonized tariff classification code module for storing a data structure representing a harmonized classification code tree in a database, the harmonized classification code tree having one or more harmonized classification codes in which the good can be classified, associating and storing keyword data related to the good with one of the harmonized classification codes in a keywords module, and learning keywords from input and associating the learned key words with the one harmonized classification code for the good. The exemplary methods and computer-readable medium also providing for receiving a query over an application programming interface requesting the harmonized classification code for the good based on the input, and accessing the database to retrieve a corresponding group of harmonized classification codes associated with the good.

A preferred method and computer-readable medium may also include displaying the group of harmonized classification codes retrieved, selecting one harmonized classification code from the retrieved group of harmonized classification codes, the one selected harmonized classification code having a keyword group and a keyword group count, and selecting the input and determining a count of keywords from the input. An exemplary method and computer-readable medium may also include the step of incrementing the keyword group count, and comparing the incremented keyword group count from the input to a predetermined keyword count. The exemplary method and computer-readable medium may also include a determined keyword count which may also be updated and the selected input appended to the keyword group if the determined keyword count from the input is greater than or equal to the predetermined keyword count. The exemplary method and computer-readable medium may also include learning keywords from the input including learning words to ignore.

It will be appreciated that system modules can be constructed, programmed or otherwise created to conduct each of the required elements including those described herein in one or more exemplary embodiments. A computer-readable medium having programming instructions stored thereon for conducting electronic commerce transactions including providing accurate shipping classifications, shipping quotations and shipping costs may also be provided in one or more of the described exemplary embodiments.

It should be noted that the term "auction" is used herein to describe a situation where a seller offers goods online via a bidding process; however, it should be understood that where context permits it should be understood to further encompass other methods and transactions by which a seller offers goods or services, such as a reverse auction, or a direct online product offering, including soliciting offers for items over a minimum price or with no minimum at all. Thus the term auction should not be understood to be limiting except where context requires it.

BRIEF DESCRIPTION OF THE DRAWINGS

In order that the advantages of the disclosure will be readily understood, a more detailed description of the disclosure briefly described above will be rendered by reference to specific embodiments that are illustrated in the appended drawings. Understanding that these drawings depict only typical preferred embodiments of the disclosure and are not therefore to be considered to be limiting of its scope, the disclosure will be described and explained with additional specificity and detail through the use of the accompanying drawings, in which:

FIG. 6 is a screen display of the administration panel shown in FIG. 5 including administrator tools for modifying the classification codes;

FIG. 7 is a screen display of the administration panel shown in FIG. 5 including administrator tools for adding keywords to be ignored by the system;

DETAILED DESCRIPTION OF THE DISCLOSURE

Figure 1:
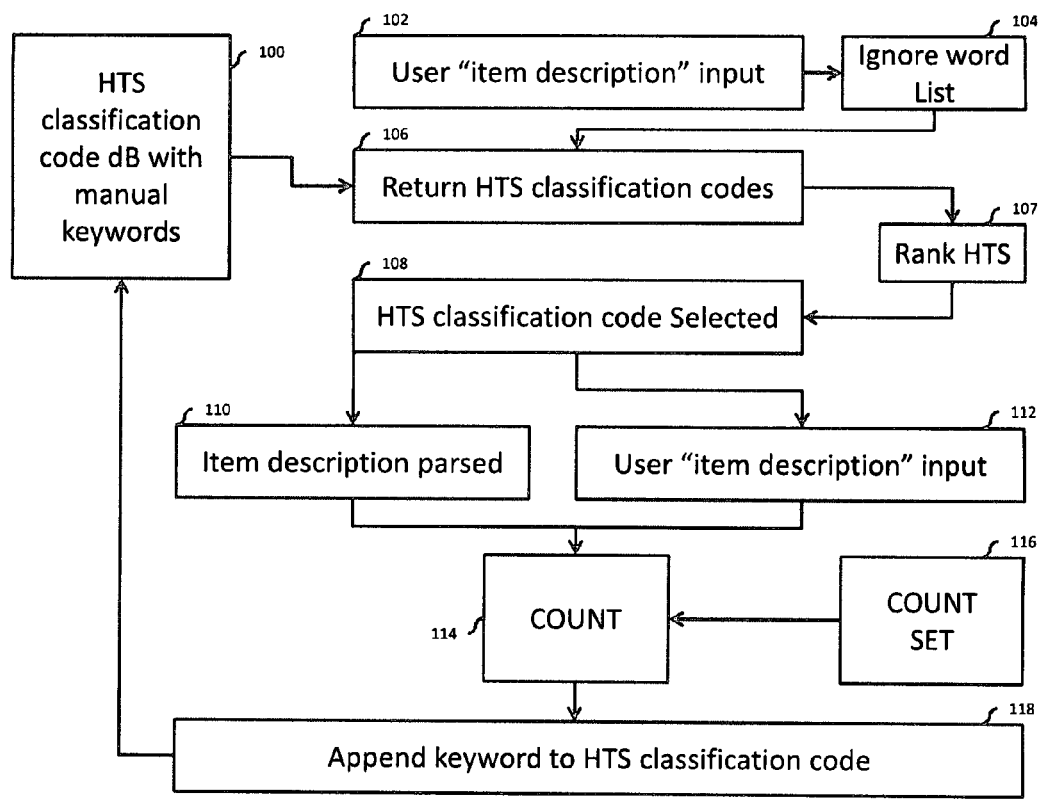
FIG. 1 is a flow diagram showing general process steps of a preferred embodiment of a system, method and computer-readable medium for delivering a harmonized classification code for a good based on an input.

Referring to FIG. 1, a schematic diagram is provided depicting the general flow of a preferred embodiment of a system, method and computer-readable medium for delivering a harmonized classification code for a good based on an input. It will be appreciated that such a system, method and computer-readable medium can be used as a module in any ecommerce system. Such a system, method and computer-readable medium for delivering a harmonized classification code for a good based on an input can be used in any transaction based online platform that auctions, offers for sale, sells or otherwise provides for purchase of a good that is contemplated for shipment domestically or internationally. It will also be understood that the input may be any type of input provided by a user of the system including plain language input, coded input, scanned input, image input or other input types that may be recognized or read by a computer, processor, reader or the like and translated for recognition by the system, method or computer-readable medium disclosed herein.

The Harmonized Commodity Description and Coding System (Harmonized System or "HS") of tariff nomenclature is an internationally standardized system of names and numbers for classifying traded products developed and maintained by an independent intergovernmental organization with over 170 member countries, known as the World Customs Organization (WCO), of which the United States is a member. The Harmonized Tariff Schedule (HTS) is the primary resource for determining tariff classifications for goods imported into the United States and foreign countries and is based on the international Harmonized Commodity Coding and Classification System (HS), which has been established by the World Customs Organization. Virtually all countries base their tariff schedules on the Harmonized System (HS), making it easier to conduct international trade. As used herein Harmonization Tariff System (HTS) includes the over 17,000 unique ten-digit HTS classification code numbers (HTC) which are arranged by product category name, use, and/or the material used in its construction in harmonization tariff code trees. The HTS publication is available in various electronic formats, including electronic databases that can be downloaded and imported in systems utilizing the methods and computer-readable medium as disclosed herein.

As can be seen from the flow chart of an exemplary embodiment in FIG. 1, a harmonized classification system code database 100 is provided for storing harmonized tariff system (HTS) classification codes and harmonized tariff system (HTS) classification code trees. The database 100 also includes keywords which are associated with various classifications within the database 100. Such keywords may be added to one or more harmonized classification codes to improve the accuracy of the code and it description for a given good which has been purchased at the site and which is to be shipped domestically or internationally. Keywords may be added manually by the administrator of the database or may be added through use of the system as described herein. During use, the system accepts an item description at 102. The item description may be entered by a user, such as a seller of a good at 102. Alternatively, the item description may be parsed into the system from an electronic listing of the good or item on an ecommerce website. Such ecommerce websites may include an auction site, classified advertisement site, social networking site, social media site, store site or the like. The system of the present disclosure may be use in conjunction with any such ecommerce site to improve the accuracy and relevance of the harmonization tariff system codes available through the site to improve shipping of goods sold through the site.

An ignored word list may also be provided at 104 for comparison to the item description input at 102. The list of words to ignore 104 may include a group of words entered by the site administrator which are simply noise words that will be ignored upon parsing of the user item description input at 102. Such ignored words may include "with," "the," "also," known as," "a," "it," "to," and similar words which do not add to the description of an item or a good being sold. It will be appreciated that the ignored word list may be different for various sites depending on their area of commerce and the goods that are sold, auctioned or otherwise listed for sale on the site. The item description at 102 is parsed. Then words are on the ignored word list at 104 are compared to the individual parsed words and the complete word phrase input at 102. If any of the words in the item description appear on the ignore word list, these words will not be considered when the HTS classification code database 100 is searched. In an alternative embodiment, the ignored word list may vary by HTS classification code. In such an embodiment, the ignored word list for one HTS classification code may be different than the ignored word list for other HTS classification codes.

After eliminating the ignored words from the ignored words list 104, each parsed word is searched in the HTS classification code database at 106. One or more HTS classification codes are returned from the search that match the keywords in the HTS classification code database 100. More than one HTS classification code may be presented at 106 based on the HTS classification database search and matches therein. If multiple HTS classification codes are presented by the search at 106, the HTS classification codes returned will be placed in a priority order based on rank at 107 which may include the number of counts from high to low of keyword matches. If a single preferred HTS classification code can not be derived by the system, root classifications may be presented for drill down by user. The user, seller or shipper may then choose the HTS classification code from a list returned through the search of the HTS classification code database at 108. The list returned may be prioritized by rank such that the most relevant HTS classification codes are at the top of the list. Relevance may be determined by the number of keywords that match the search of the HTS classification code database 100. It is contemplated that the user may make the choice of the appropriate database based on the choices presented by the method and system disclosed.

In the preferred embodiment of FIG. 1, the system, method and computer-readable medium includes the ability to taxonomically learn keywords entered through the input of the item description at 102 by parsing the item description into individual keywords at 110 and maintaining the complete item description at 112, eliminating the "noise" or irrelevant words from the parsed words at 104 and searching each keyword 110 and the complete item description 112 in the HTS classification code database 100. Each of the parsed keywords 110 from the item description, after elimination of the ignored words from the ignored word list at 104, and the complete item description itself 112 are searched in the HTS classification database 100 and a list of HTS classification codes are returned that match each keyword and the complete item description searched at 108. Each such retrieved HTS classification code includes a count at 114 of each keyword 110 and the complete item description 112 included with each returned or retrieved HTS classification code. Each time the word or complete item description is searched in the database, the count is incremented by one and stored in the HTS classification code database as the new count for that HTS classification code at 114.

The system, method and computer-readable medium in the illustrated preferred embodiment of FIG. 1 also includes comparing the count returned for each keyword at 114 with a set count at 116. The set count may be determined by the site administrator to be the threshold at which the keyword or phrase returned or retrieved at 110, 112 is considered valid and relevant to the item being searched. If the set count is equal to or greater than the current count for each keyword 110 or item description 112, then the keyword or item description is appended to the HTS classification code selected by the user at 108. If a keyword or item description phrase is appended to the selected HTS classification code at 118, then the HTS classification code with the appended words or phrase is returned and updated in the HTS classification manual database at 100. If the set count at 116 is less than the current count 114, then the keyword or phrase is not relevant to the HTS classification code selected at 108 and the keyword or item description is not appended to the selected HTS classification code.

Figure 2:
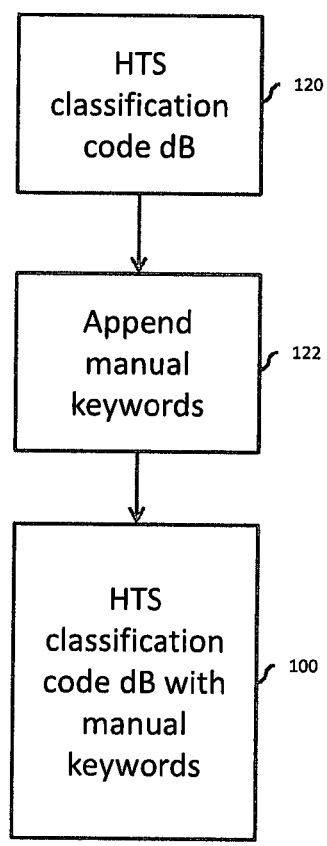
FIG. 2 is a flow diagram showing further details of the steps of FIG. 1 including the process steps for updating the classification code database with keywords.

As noted above, the HTS classification code database may be available electronically and can be imported into the system as illustrated at 120 in FIG. 2. In this preferred embodiment, after the HTS classification code database 120 is imported into the system described herein, keywords can be manually appended at 122 to enhance the relevance to each HTS classification code for given items or goods. The site administrator may initially append known relevant keywords to specific HTS classification codes to improve the relevance of the search functionality of the HTS classification code database with manual keywords 100. This will improve the ease of search and present more relevant and accurate classification code choices to the user of the system for particular goods and items as the taxonomic features of the system are developed and matured through use.

It will be appreciated that as additional keyword information is developed over the internet or through other website activity, the site administrator can retrieve such additional information and update the HTS classification code database with keywords at 100. In addition, it is contemplated that such updates, as illustrated in a preferred embodiment in FIG. 2, can occur through various databases that report information regarding HTS classification codes. Such databases may include, but are not limited to, governmental databases and other databases that store relevant United States International Trade Commission decisions reporting updates and findings related to various hearings on HTS classification code issues.

It will also be appreciated that update information for various goods and items may be available at various websites and through other online resources. Accordingly, it is contemplated that searching these sites and resources for updated information may include the use of a wide variety of tools to capture information that may automate such searches. Such tools may include smartphones, cameras, bar code scanners, QR code scanners, and other capture devices to create the data, links or other identifiers necessary to search the internet. All of such tools are contemplated for use by the system, method and computer-readable medium for delivering a harmonized classification code for a good based on an input as disclosed herein.

As may be appreciated by those skilled in the art, the system, method and computer-readable medium for delivering a harmonized classification code for a good based on an input includes a group of interrelated databases and database tables. Such tables provide for the storage and retrieval of data regarding system operation, system activities including routines and sub-routines to be performed on data dynamically as the site is updated by users, including creating, updating and modifying HTS classification codes, item descriptions, keyword lists, ignored word lists, counts on the site and other site activity. Such databases and associated data tables may include one or more of the following inter-relational data elements: administrator activities, advertisements, country details, document types, email details, exception words, export fees, HTS codes, HTS customs rules, import fees, international shipping details, keywords, site configuration, automatic additions, billing details, shipping details, item details, registration details, online user details and various additional data elements to import, update, track and improve the accuracy and usefulness of the HTS classification code database through taxonomic updating capabilities as disclosed herein. It is contemplated that the ability to taxonomically learn keywords entered through the input of the item description may also apply to the words that are to be ignored by the system. An alternative embodiment may include parsing data input to the system and comparing such to a list of known "noise" words allowing the system to taxonomically learn such words and add them to the ignored word list for one or more HTS classification codes, or add them to the ignored word list for the whole system. Such learning and taxonomic features will add to the automation and usefulness of the disclosed system, method and computer-readable medium.

The use and design of a preferred embodiment of the system, method and computer code disclosed herein will now be described in more detail through the use of exemplary screens which may be used on a site including the social platform and ecommerce system described herein. It should be understood that the screen displays illustrated are only exemplary, that the screens can be formatted in a variety of layouts and may include a variety of data fields and design elements, and that the data tables described herein are updated as necessary to provide efficient operation of the embodiments of system, method and computer code disclosed herein.

Figure 3:
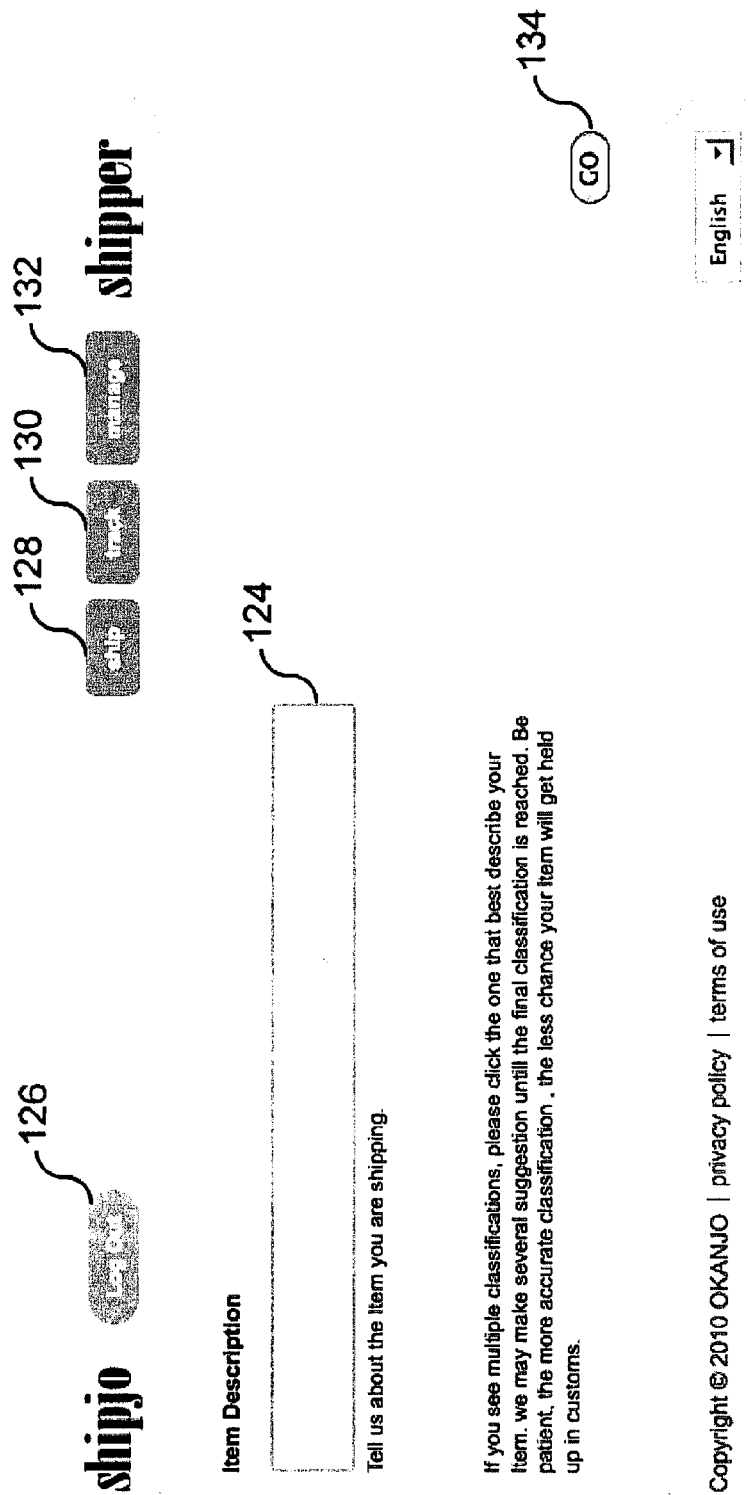
FIG. 3 is a screen display of an exemplary page of a site using the disclosed system and method for user entry of the description of a good or item.

FIG. 3 illustrates an exemplary screen display of an exemplary system, method and computer-readable medium for delivering a harmonized classification code for a good based on an input. The item description is input for the item to be shipped at 124. The input may be plain language or any other form of information that can be converted by the system to plain language for use by the system, method and computer-readable medium as described herein. From the illustrated screen the user may log out at 126, begin the shipping process at 128, track a shipment in transit at 130 or manage the user's account at 132. After the item description is input or entered at 124, the user chooses "go" at 134 to begin the search of the HTS classification code database 100.

Figure 4:
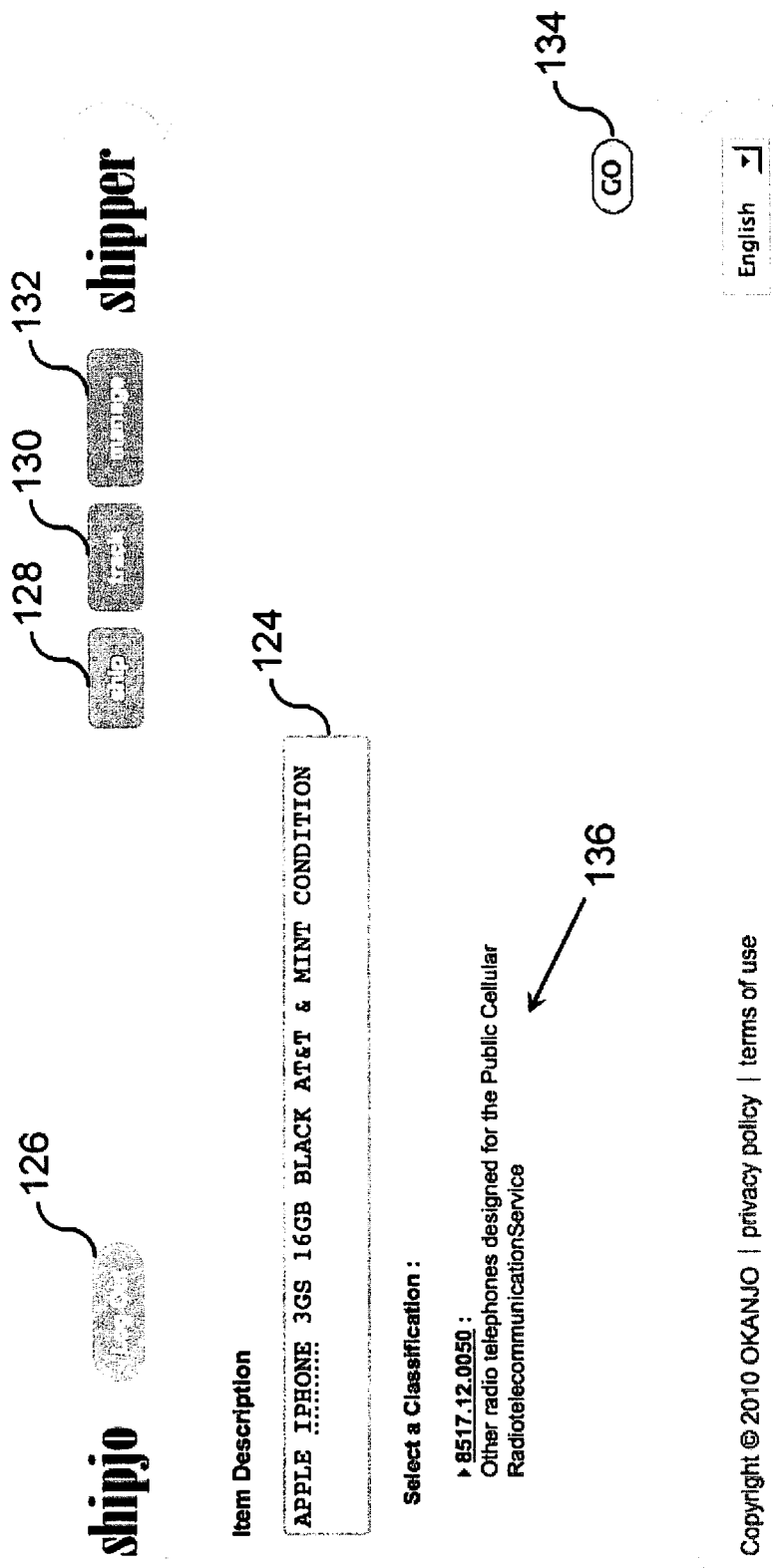
FIG. 4 is a screen display of an exemplary page of a site using the disclosed system and method displaying a harmonization code classification based on a description input.

As shown in the exemplary screen of FIG. 4, after the HTS classification code database 100 is searched by entry of the item description at 124, the HTC classification codes 136 are presented based on the matches of the keywords and the complete item description from the HTC classification database 100. More than one HTS classification code may be presented based on the HTS classification database search and matches therein. If multiple HTS classification codes are presented by the search, the HTS classification codes returned will be placed in priority order based on rank which may include the number of counts from high to low of keyword matches. If a single preferred HTS classification code can not be derived by the system, root classifications may be presented for drill down by user. As described above, once a final HTS classification code is selected by the user, the keywords input by the user or shipper are parsed and each compared to the previous count retrieved from the HTS classification database. Such count comparison determines if the current count is greater than or equal to the count set by the site administrator. If the current count is greater than or equal to the count set by the administrator, then the respective keyword is appended to the final HTS classification code and the HTS classification code database 100 is updated.

Figure 5:
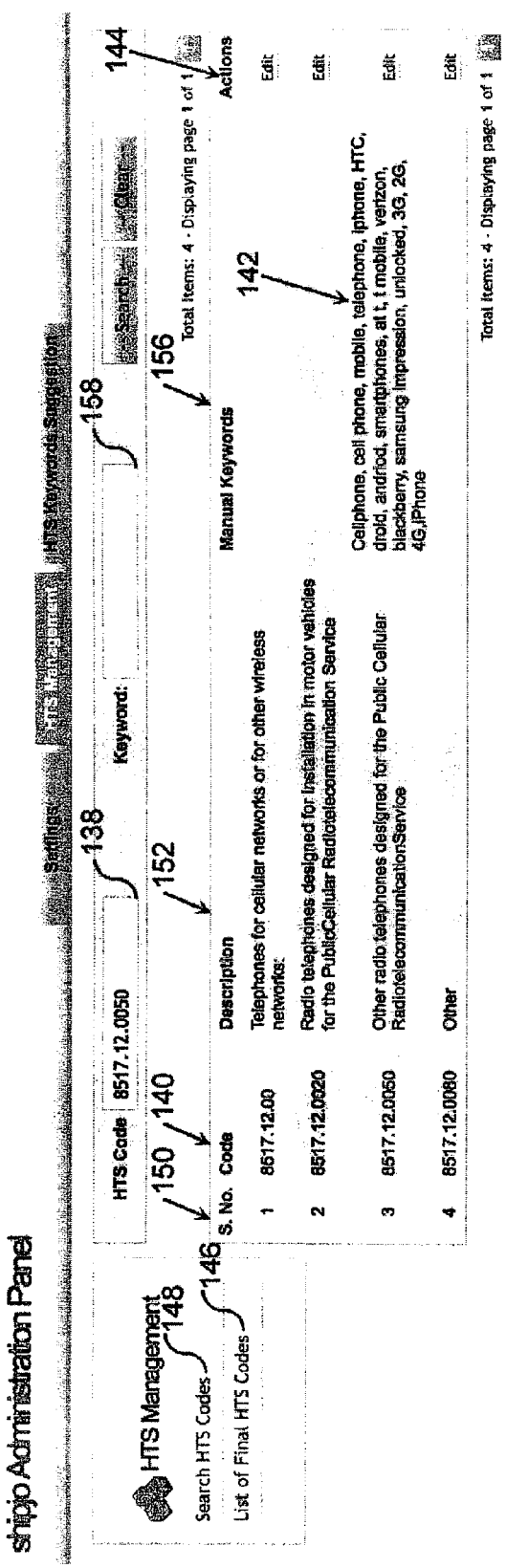
FIG. 5 is a screen display of an exemplary page of a site using the disclosed system and method displaying the administration panel.

FIG. 5 illustrates an exemplary screen showing the administration area of a preferred embodiment of the disclosed system, method and computer-readable medium for delivering a harmonized classification code for a good based on user input. For a given HTS classification code input at 138, the root HTS classification codes are displayed at 140. Keywords 142 may be entered or edited by the site administrator by access at 144. Such Keywords 142 may include specific relevant descriptive words including such terms as brand names, model names, model numbers and other item descriptors. As described above, publicly available information including available HTS classification codes may be imported into the HTS classification database 100 through use of portal 146. The HTS classification codes included in HTS classification database 100 can be searched through access to a search window at 148. The administration panel illustrated in FIG. 5 also includes the system number at 150, the classification code description at 152 and the added manual key words at 156. Keywords can be searched throughout HTS classification database 100 by entering a search term at 158.

As illustrated in the exemplary screen of FIG. 6, the site administrator may choose the HTS Keywords Suggestion tab at 160. From tab 160 the site administrator may choose to search the keyword list at 178 to access an interface screen to add, delete or otherwise modify the parsed keywords 170 by manually adding or ignoring the association to the chosen HTS classification code. Such action is achieved by choosing the "add" button at 162 or the "ignore" button at 164. As additional keywords are determined to be relevant for a specific HTS classification code 168 by the site administrator, the "add" button 162 can associate such additional keywords with a specific HTS classification code. If the site administrator determines that one or more keyword associations are incorrect or otherwise undesirable for a give HTS classification code, the site administrator can choose the "ignore" button 164 to disassociate a given keyword with a specific HTS classification code 168. Keywords may be searched by the site administrator by entering keywords in search box 172, or a HTS classification code in search box 174 or a count at 176. The site administrator can search for specific keywords, HTS classification codes or counts throughout the HTS classification database after entering a given field 172, 174, 176 by using search button 180. The entries in the search boxes 172,174 and 176 can be cleared through use of clear button 182. The automatic addition of any keyword can be reversed or modified through the HTS Keyword Suggestion tab 160 as indicated herein.

As shown in the exemplary screen of FIG. 7, the HTS Keyword Suggestion tab 160 also provides the site administrator with access to the ignored word list through button 184. The site administrator may manually add a given word to the ignored word list through search box 186 and pressing the "add" button 188. The site administrator can choose to ignore a given word throughout the site or on a category by category basis as described above. As shown in the code column 168, a code number may be indicated meaning that the specified keyword is associated with the identified HTS classification code. The term "manual" indicates that the keyword is not associated with any other HTS classification code on the site. The addition of a word to the ignored list will prevent that word from being considered in the search of an item description in input or entry box 124. Entries to the ignored word list can be eliminated by use of the "delete" button associated with each ignored word entry.

Figure 8:
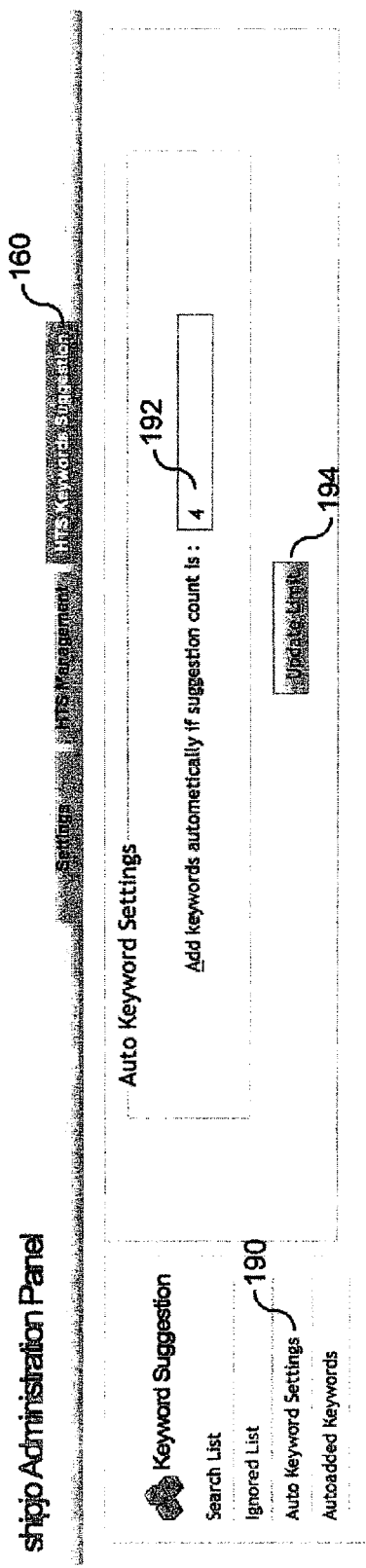
FIG. 8 is a screen display of the administration panel shown in FIG. 5 including administrator tools setting the threshold count for adding keywords a harmonization code classification.

As illustrated in the exemplary screen of FIG. 8, the site administrator can modify the keyword count by choosing the auto keyword settings tab 190 from the administration panel at the HTS keywords suggestion tab 160. The site administrator can adjust the set count 116 (see FIG. 1) by choosing the set count number in box 192. Upon pressing the update limit button at 194, the set count will be modified.

Mobile scanning applications including bar code scanning, QR code scanning, image scanning and similar scanning applications are contemplated for use by the systems, methods and computer-readable medium disclosed herein. Such scanning applications may be used for seamless searching of content and for inputting data into the system for updating HTS classification codes as well as for efficient management of the system and methods disclosed herein.

Use of Web 2.0 is a trend in World Wide Web technology and web design. It is a second generation of web-based communities and hosted services such as social-networking sites, wikis, blogs, and folksonomies, which aim to facilitate creativity, collaboration, and sharing among users. Web 2.0 websites allow users to do more than just retrieve information. They can build on the interactive facilities of "Web 1.0" to provide "network as platform" computing, allowing users to run software-applications entirely through a browser. Users can own the data on a Web 2.0 site and exercise control over that data. These sites may have an "architecture of participation" that encourages users to add value to the application as they use it. Web 2.0 characteristics and design functionality is contemplated by the systems and methods, including the ecommerce, auction and social platform techniques disclosed herein.

Many of the functional units described in this specification have been labeled as modules, in order to more particularly emphasize their implementation independence. For example, a module may be implemented as a hardware circuit comprising custom very large scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

A non-transitory computer-readable medium or computer program product may be embodied by a transmission line, a compact disk, digital-video disk, a magnetic tape, a Bernoulli drive, a magnetic disk, a punch card, flash memory, integrated circuits, or other digital processing apparatus memory device or bulk storage medium. Furthermore, the described features, structures, or characteristics of the invention may be combined in any suitable manner in one or more embodiments. In the forgoing description, numerous specific details are provided, such as examples of programming, software modules, user selections, network transactions, database details, database structures, hardware modules, and other semiconductor devices to provide a thorough understanding of embodiments of the invention. One skilled in the art will recognize, however, that the invention may be practiced without one or more of the specific details, or with other methods, components, materials, and the like. In other instances, well-known structures, materials, or operations are not shown or described in detail to avoid obscuring aspects of the invention.

It will be understood by those skilled in the art that a computer system or data processing system hosting or running the computer program can be configured to access a variety of signals, including but not limited to signals downloaded through the internet or other networks. Such may include distribution of executable software program(s) over a network, distribution of computer programs on a CD ROM or via Internet download and the like. These instructions may reside, for example, in RAM, ROM or other storage media of the computer. Alternatively, the instructions may be contained on a data storage or computer-readable medium, such as a computer CD, DVD, ROM, RAM, CD-ROM, CD-R/W or diskette. Furthermore, the instructions may be stored on a DASD array, magnetic tape, conventional hard disk drive, electronic read-only memory, flash memory, optical storage device, or other appropriate data storage device within an internal or external network, over the internet or on the "cloud." In such an alternate embodiment, the computer-executable instructions may be lines of compiled executable code as available in any computer executable code, steps or language.

A computer or data processing system suitable for storing and/or executing program code may include at least one processor coupled directly or indirectly to memory elements through a system bus. The memory elements may include local memory employed during actual execution of the program code, bulk storage, and cache memories that provide temporary storage of at least some program code in order to reduce the number of times code is retrieved from bulk storage during execution. Input/output or I/O devices (including but not limited to keyboards, displays, pointing devices, and other user interfaces) may be coupled to the system either directly or through intervening I/O controllers. Network adapters may also be coupled to the system to enable the data processing system to become coupled to one or more data processing systems or remote printers or storage devices through private or public networks, including the "cloud." Modems, cable modem and Ethernet cards are just a few of the currently available types of network adapters.

The invention has been described with reference to preferred implementations or embodiments thereof but it will be appreciated that variations and modifications within the scope of the claimed invention will be suggested to those skilled in the art. For example, the invention may be implemented on networks including ethernet, token ring and the like or used to control other aspects of a system. The method, apparatus and computer code of the present invention may be extended to monitor other devices which exhibit a plurality of operational modes. Reference throughout this specification to "the embodiment," "this embodiment," "the previous embodiment," "one embodiment," "an embodiment," "a preferred embodiment" "another preferred embodiment or similar language means that a particular feature, structure, or characteristic described in connection with the embodiment is included in at least one embodiment of the present invention. Thus, appearances of the phrases "in the embodiment," "in this embodiment," "in the previous embodiment," "in one embodiment," "in an embodiment," "in a preferred embodiment," "in another preferred embodiment," and similar language throughout this specification may, but do not necessarily, all refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

While the present invention has been described in connection with certain exemplary or specific embodiments, it is to be understood that the invention is not limited to the disclosed embodiments, but, on the contrary, is intended to cover various modifications, alternatives, modifications and equivalent arrangements as will be apparent to those skilled in the art. Any such changes, modifications, alternatives, modifications, equivalents and the like may be made without departing from the spirit and scope of the invention.

What is claimed is:

1. A system for delivering a harmonized classification code for a good based on input, comprising:
    a database adapted to store content including a harmonized tariff classification code module for storing a data structure representing a harmonized classification code tree, the harmonized classification code tree having one or more harmonized classification codes in which the good can be classified;
    a keywords module for associating and storing keyword data related to the good with one of the harmonized classification codes; and
    a learning module for learning keywords from the input, for determining a keyword group and a keyword group count from the learned keywords, and associating the learned key words and keyword group count with the one harmonized classification code for the good.

2. The system of claim 1 including a processor configured to receive a query over an application programming interface requesting the harmonized classification code for the good based on the input, the processor accessing the database to retrieve a corresponding group of harmonized classification codes associated with the good.

3. The system of claim 2 including an application programming interface displaying the group of harmonized classification codes retrieved by the processor, selecting one harmonized classification code from the group of harmonized classification codes and selecting the input and the processor determining a count of keywords from the input.

4. The system of claim 3 wherein the processor increments the keyword group count, and the application programming interface comparing the incremented keyword group count from the input to a predetermined keyword count.

5. The system of claim 4 wherein the processor updates the determined keyword count and appending the selected input to the keyword group if the determined keyword count from the input is greater than or equal to the predetermined keyword count.

6. The system of claim 1 wherein the learning module includes a module of words the learning module will ignore when learning keywords from the input.

7. A method for providing a harmonized classification code for a good based on input comprising:
    storing content including a harmonized tariff classification code module for storing a data structure representing a harmonized classification code tree in a database, the harmonized classification code tree having one or more harmonized classification codes in which the good can be classified,
    associating and storing keyword data related to the good with one of the harmonized classification codes in a keywords module; and
    learning keywords from input, for determining a keyword group and a keyword group count from the learned keywords, and associating the learned key words and keyword group count with the one harmonized classification code for the good.

8. The method of claim 7 including receiving a query over an application programming interface requesting the harmonized classification code for the good based on the input, and accessing the database to retrieve a corresponding group of harmonized classification codes associated with the good.

9. The method of claim 8 including displaying the group of harmonized classification codes retrieved, selecting one harmonized classification code from the retrieved group of harmonized classification codes, and selecting the input and determining a count of keywords from the input.

10. The method of claim 9 including the step of incrementing the keyword group count, and comparing the incremented keyword group count from the input to a predetermined keyword count.

11. The method of claim 10 including updating the determined keyword count and appending the selected input to the keyword group if the determined keyword count from the input is greater than or equal to the predetermined keyword count.

12. The method of claim 7 wherein learning keywords from the input includes learning words to ignore.

13. A non-transitory computer-readable medium having programming instructions stored thereon for providing a harmonized classification code for a good based on input including:
    storing content including a harmonized tariff classification code module for storing a data structure representing a harmonized classification code tree in a database, the harmonized classification code tree having one or more harmonized classification codes in which the good can be classified, associating and storing keyword data related to the good with one of the harmonized classification codes in a keywords module; and learning keywords from input, for determining a keyword group and a keyword group count from the learned keywords, and associating the learned key words and keyword group count with the one harmonized classification code for the good.

14. The non-transitory computer-readable medium of claim 13 including receiving a query over an application programming interface requesting the harmonized classification code for the good based on the input, and accessing the database to retrieve a corresponding group of harmonized classification codes associated with the good.

15. The non-transitory computer-readable medium of claim 14 including displaying the group of harmonized classification codes retrieved, selecting one harmonized classification code from the retrieved group of harmonized classification codes and selecting the input and determining a count of keywords from the input.

16. The non-transitory computer-readable medium of claim 15 including the step of incrementing the keyword group count, and comparing the incremented keyword group count from the input to a predetermined keyword count.

17. The non-transitory computer-readable medium of claim 16 including updating the determined keyword count and appending the selected input to the keyword group if the determined keyword count from the input is greater than or equal to the predetermined keyword count.

18. The non-transitory computer-readable medium of claim 13 wherein learning keywords from the input includes learning words to ignore.

\* \* \* \* \*